United States Patent
Rex et al.

(10) Patent No.: US 6,481,762 B1
(45) Date of Patent: Nov. 19, 2002

(54) PIPE COUPLING

(75) Inventors: Brian Rex, Hitchin (GB); Brian Harper, Hitchin (GB)

(73) Assignee: Glynwed Pipe Systems Limited, Birmingham (GB)

( * ) Notice: Subject to any disclaimer, the term of this patent is extended or adjusted under 35 U.S.C. 154(b) by 0 days.

(21) Appl. No.: 09/495,595

(22) Filed: Feb. 1, 2000

(30) Foreign Application Priority Data

Feb. 2, 1999 (GB) .............................................. 9902326

(51) Int. Cl.$^7$ ................................................ F16L 17/00
(52) U.S. Cl. ........................... 285/337; 285/55; 285/95; 285/99; 285/104; 285/148.6; 285/335; 285/364
(58) Field of Search .................................. 285/337, 335, 285/148.6, 364, 55, 95, 99, 104

(56) References Cited

U.S. PATENT DOCUMENTS

| | | | | |
|---|---|---|---|---|
| 2,887,328 A | * | 5/1959 | Risley et al. | 277/625 |
| 3,375,025 A | * | 3/1968 | Engel | 285/15 |
| 3,547,471 A | * | 12/1970 | Dunmire | 285/337 |
| 3,740,082 A | * | 6/1973 | Shustack | 285/342 |
| 4,070,046 A | * | 1/1978 | Felker et al. | 285/337 |
| 4,108,481 A | * | 8/1978 | Graham | 285/231 |
| 4,298,206 A | | 11/1981 | Kojima | 277/205 |
| 4,569,542 A | * | 2/1986 | Anderson et al. | 285/337 |
| 4,579,353 A | * | 4/1986 | Bower | 277/207 |
| 4,741,560 A | * | 5/1988 | Vigneron | 285/91 |
| 5,094,492 A | * | 3/1992 | Levivier | 285/104 |
| 5,150,929 A | * | 9/1992 | Greatorex | 285/231 |
| 5,360,218 A | * | 11/1994 | Percibois et al. | 277/181 |
| 5,645,285 A | * | 7/1997 | Percibois et al. | 277/207 |
| 5,851,037 A | * | 12/1998 | Bridges | 285/342 |
| 6,168,210 B1 | * | 1/2001 | Bird | 285/337 |

FOREIGN PATENT DOCUMENTS

| | | | | |
|---|---|---|---|---|
| DE | 0334380 A2 | * | 9/1989 | 285/337 |
| EP | 0 794 378 A2 | | 9/1997 | |
| GB | 0641085 A | * | 8/1950 | 285/337 |
| GB | 641085 | | 8/1950 | |
| GB | 2 016 626 | | 9/1979 | |
| GB | 2016626 A | * | 9/1979 | 285/337 |
| GB | 2 251 905 A | | 7/1992 | |
| GB | 2251905 A | * | 7/1992 | 285/337 |
| IT | 0532173 A | * | 4/1958 | 285/337 |

OTHER PUBLICATIONS

European Search Report; Application No. EP 00 30 0654; 3 pgs. (Jul. 27, 2000).
UK Search Report; Application No. GB 9902326.9; 2 pgs. (Feb. 14, 2000).

* cited by examiner

Primary Examiner—Lynne H. Browne
Assistant Examiner—Carlos Lugo
(74) Attorney, Agent, or Firm—Testa, Hurwitz & Thibeault, LLP

(57) ABSTRACT

A pipe coupling for attachment to a pipe includes a sleeve. One end of the sleeve is configured to receive a pipe end. The pipe coupling also includes an annular gasket disposed within the end of the sleeve for encircling the pipe end. The coupling includes a flanged assembly for compressing the annular gasket to form a seal between the pipe and the sleeve. The sleeve and the gasket are configured so as to define a leak path between an axially inner portion of the gasket and the inner surface of the sleeve, whereby pressurized fluid from the pipe may pass along the leak path so as to pressurize a radially outer surface of the gasket and urge the gasket against the compression flange to enhance the seal between the gasket and the sleeve.

55 Claims, 3 Drawing Sheets

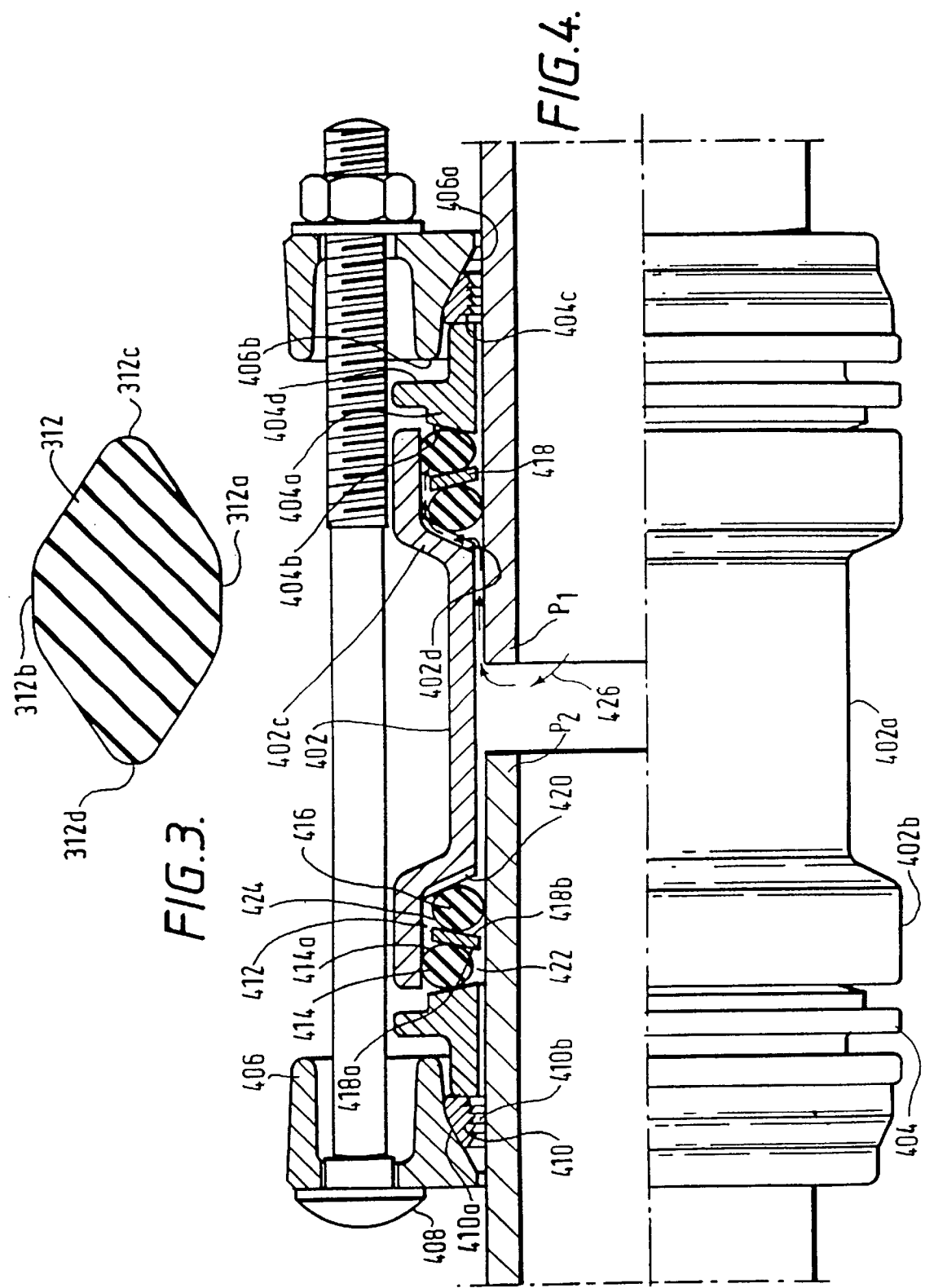

PIPE COUPLING

This invention relates to a pipe coupling and to a pipe joint formed from the pipe coupling.

BACKGROUND OF THE INVENTION

Mechanical couplings for coupling together pipes formed from plastics materials such as polyolefins and polyvinyl chloride are well known. Such couplings typically comprise a sleeve, a compression collar, a seal disposed axially between the sleeve and compression collar and means (e.g. a compression flange and flange bolts) for compressing the compression collar against the seal to deform it radially inwardly and into sealing contact with the pipe. In addition, it is customary for the coupling to contain a gripping ring or other gripping element to prevent the pipe from being pulled out of the coupling.

A problem with such mechanical couplings is that unless the end of the pipe is supported, it can collapse under compression by the sealing assembly. Consequently, it is usual to place a cylindrical supporting member, e.g. formed from a stiffer plastics material or a metal, within the bore of the pipe end, to prevent the pipe end from collapsing when compressed. Such supporting members are, however, considered undesirable for several reasons. For example, the bore upset caused by the presence of the supporting member can interfere with the flow properties of the pipe, particularly with viscous materials or fluids containing solids. With more abrasive fluids such as slurries, any reduction in the pipe bore can cause increased wear and erosion of the pipe wall and supporting member.

A further problem with conventional pipe couplings is that the time taken to tighten a large number of flange bolts to the torque necessary to achieve a good seal between the pipe, gasket and seal can be considerable. It would therefore be advantageous if the number of flange bolts could be reduced, and the torque needed to achieve an efficient seal reduced without any loss of seal integrity.

A still further problem is that conventional pipe couplings of the type mentioned above are not suitable in many cases for use with pipes formed of more brittle materials such as clay, and this is due to the high compressive forces applied to the pipes to achieve an efficient seal which, if applied to brittle pipes could lead to pipe collapse or fracture.

Attempts have been made by the present inventors to obviate the need for the supporting inserts by using pressure responsive sealing systems such as lip seals and O-rings. However, both approaches present additional problems. In the case of O-rings, it can be very difficult in practice to insert a pipe through a seal without using tremendous force, which can often be beyond the capability of one person, or even two people, without special tools. In the case of lip seals, whilst they are easier to install on the pipe, it is not possible to assemble the pipe coupling wholly on one pipe to enable repair sections to be inserted, nor is it possible to allow the last connection to be made between two plain ended sections of pipe.

It is an object of the present invention to overcome the aforementioned problems and to provide a pipe coupling for plastics pipes in which the use of supporting inserts can be avoided without compromising the integrity of the seal.

SUMMARY OF THE INVENTION

Accordingly, in a first aspect, the invention provides a pipe coupling for attachment to a pipe, the coupling comprising a sleeve, at least one end of which is configured to receive therein an end of the pipe; annular sealing means disposed within the end of the sleeve for encircling the pipe end; and compression means for compressing the annular sealing means to form a seal between the pipe and the sleeve; characterised in that the sleeve and/or the sealing means are configured so as to define a leak path between an axially inner portion of the sealing means and the inner surface of the sleeve whereby in use pressurized fluid from the pipe may pass along the leak path so as to pressurize a radially outer surface of the sealing means and urge the axially outer sealing means against the compression means and the axially inner portion of the sealing means against the pipe thereby to enhance the seal between the sealing means and the sleeve, and the sealing means and the pipe.

The pipe couplings of the invention are particularly suited for coupling together plastics pipes and pipes formed from materials which can break or distort such as clay and concrete. Particular examples of plastics pipes which can be connected together using the couplings of the invention include pipes formed from a polyolefin (such as polyethylene) or polyvinylchloride. It has been found that by providing a leak path between the axially inner portion of the seal and the sleeve such that an axially outer portion of the sealing means is compressed against the compression means and the axially inner portion of the sealing means is compressed against the pipe, an effective seal can be formed at a much lower compression force. This in turn means that it is possible to omit the supporting or reinforcing inserts typically used to prevent the collapse of the ends of plastics pipes when coupled together using mechanical couplings. Moreover, in the case of pipes formed from brittle materials such as clay, significantly lower compressive forces can be applied to the gasket without reducing the integrity of the seal, thereby reducing the risk of the pipe breaking under compression.

In this specification, the terms "axially outer" and "axially inner" are used to denote to denote the positions of elements relative to the mid point of the sleeve. An element described as "axially outer" is further from the mid point of the sleeve than an element described as being "axially inner". Thus the axially outer portion of the sealing means is further from the mid point of the sleeve than the axially inner portion.

The term "radially inner" as used herein with regard to the sealing means refers to a portion or surface which faces the pipe, whereas the term "radially outer" refers to a portion or surface which faces the sleeve. The terms are not intended to mean that the surfaces or portions in question are parallel to the axis of the pipe, although in certain circumstances they may be.

Underlying the present invention is the recognition that by forming a leak path between an axially inner portion of the sealing means and the inner surface of the sleeve, the seal can be made at least partially pressure-responsive—i.e. the pressure of fluid in the pipe can be used to compress the sealing means against the sleeve and the pipe thereby enhancing the strength of the seal.

Either the sleeve or the sealing means, or both, may be configured to provide the leak path. The leak path is typically defined by means of channels formed between the sealing means and the sleeve. Thus, for example, the sleeve may be provided with one or more grooves in the surface thereof which by-pass the axially inner portion of the sealing means. Although one groove may be sufficient to provide the desired degree of leakage, a plurality of grooves can be provided, for example spaced circumferentially around the sleeve. The or each groove can be aligned with the axis of the pipe or at an angle to the axis of the pipe. In one embodiment, for example, the or each groove can follow a helical path around the surface of the sleeve. As an alternative to grooves, the channels can be defined by means of protrusions, e.g. ribs, studs or bosses, on the inner surface of the sleeve which partially space the sealing means away from the surface of the sleeve.

Alternatively, or additionally, the sealing means itself can be configured to provide the leak path. For example, the sealing means can be provided with one or more grooves or passages therein or therethrough which permit the passage of fluid. Such grooves or passages can optionally be reinforced with a stiffer material such as a metal or a non-elastomeric plastics material in order to prevent the grooves or passages collapsing during compression.

The sealing means, sleeve and compression means are preferably configured such that in use, upon application of a compression force through the compression means, the axially outer portion of the sealing means is forced radially outwardly and into sealing engagement with the sleeve, whilst the axially inner portion of the sealing means is urged radially inwardly and into sealing engagement with the pipe.

In order to assist leakage of the fluid to compress the axially outer portion of the sealing means against the compression means, an annular void is typically formed between the axially inner portion of the sealing means and the sleeve, the annular void being in fluid communication with the leak path.

The end of the sleeve typically has an enlarged bore region within which is disposed the sealing means. The enlarged bore portion is usually linked to a relatively reduced bore region of the sleeve by an annular abutment surface. In order to assist compression, the annular abutment surface is preferably inclined radially outwardly (i.e flared) in the direction of the end of the sleeve.

A variety of differently shaped sealing means can be used but in one preferred embodiment, the sealing means takes the form of a multi-lobed sealing member, and in particular a sealing member which in cross section has two lobes. The two lobes can be of the same or different shape and can be, for example, of circular, ovoidal or polygonal shape. Where one or both lobes are polygonal in cross section, the polygon can be regular or irregular, particular examples being rectangular, pentagonal, hexagonal, heptagonal, octagonal, nonagonal and decagonal. Such polygonal lobes can have rounded or radiused edges. A most preferred sealing member of the invention has a cross sectional shape in the form of a filled figure of eight, a shape which can be regarded as functioning in a similar manner to a pair of O-rings joined together but has the advantage that the potential leakage between a pair of O-rings is avoided.

Alternatively, the sealing means can comprise a pair of O-rings. The two O-rings can advantageously be separated by a spacer ring which can, for example, have an inclined axially inner surface whereby compression of the axially inner O-ring by the spacer ring upon application of the compression means urges the said axially inner O-ring against the pipe. Alternatively or additionally, the spacer ring can have an inclined axially outer surface which assists in deforming the axially outer O-ring outwardly against the sleeve when the said axially outer O-ring is compressed by the compression means.

In a still further embodiment, the sealing means has a substantially trapezoidal cross section. In this embodiment, the trapezoidal shape may have a pair of axially aligned edges and a pair of radially aligned edges, the distance between the axially aligned edges being greater than the distance between the radially aligned edges. In order to assist in holding the sealing means against rotation, the radially aligned edges may be flattened. Alternatively, or additionally, the sleeve and the compression means can be provided with locating means for locating and holding one or more edges of the trapezoidal sealing member so as to prevent rotation. Such locating means can take the form of, for example, a groove or recess into which an edge of the sealing means can fit.

The compression means can take the form of a compression flange or compression collar which is drawn axially towards the sealing means for example by means of a screw thread or by the tightening of flange bolts. Such compression means can be entirely conventional.

In one embodiment, the compression means comprises an annular compression member which is arranged to encircle the pipe, means being provided for moving the annular compression member axially towards the sleeve and against the sealing means.

In a particular embodiment, the compression means can comprise an annular compression flange disposed axially outwardly of the annular compression member and a plurality of flange bolts to enable the annular compression flange to be tightened against the annular compression member thereby to compress the sealing means. Such an arrangement is particularly preferred when a separate gripping ring is employed as well as the sealing member. Thus the gripping member can be disposed axially between the compression flange and the compression member whilst the sealing means is disposed between the compression member and the sleeve. When a gripping ring is present, this can be arranged to be deformed radially inwardly against the pipe member by compression between the compression flange and compression member.

Alternatively, the separate compression member can be omitted and compression of the sealing means can be effected between a surface of the compression flange and the sleeve. Such an arrangement is particularly preferred when no separate gripping ring is present.

The pipe couplings of the invention can be used to couple together a pair of pipes, or can be used to couple a pipe to a non-pipe element, for example a tank or a pump. The term pipe as used herein includes pipes as such, and also pipe-like structures such as elbows, bends, tees, valves for example.

In a preferred embodiment, both ends of the sleeve are arranged to receive therein the respective ends of a pair of pipes. In particular, it is preferred that the sleeve, annular sealing means and compression means have substantially the same configuration at both ends of the sleeve.

In another aspect of the invention, there is provided a pipe joint comprising a pipe coupling as hereinbefore defined having a pipe disposed in the end of the sleeve thereof.

The invention will now be illustrated, but not limited, by reference to the particular embodiments shown in the accompanying drawings.

BRIEF DESCRIPTION OF THE DRAWINGS

FIG. 3 is a sectional elevation of an alternative gasket shape.

FIG. 4 is a sectional elevation through a pipe coupling and pipe joint according to a third embodiment of the invention.

DETAILED DESCRIPTION OF THE PREFERRED EMBODIMENTS

Figure 1:
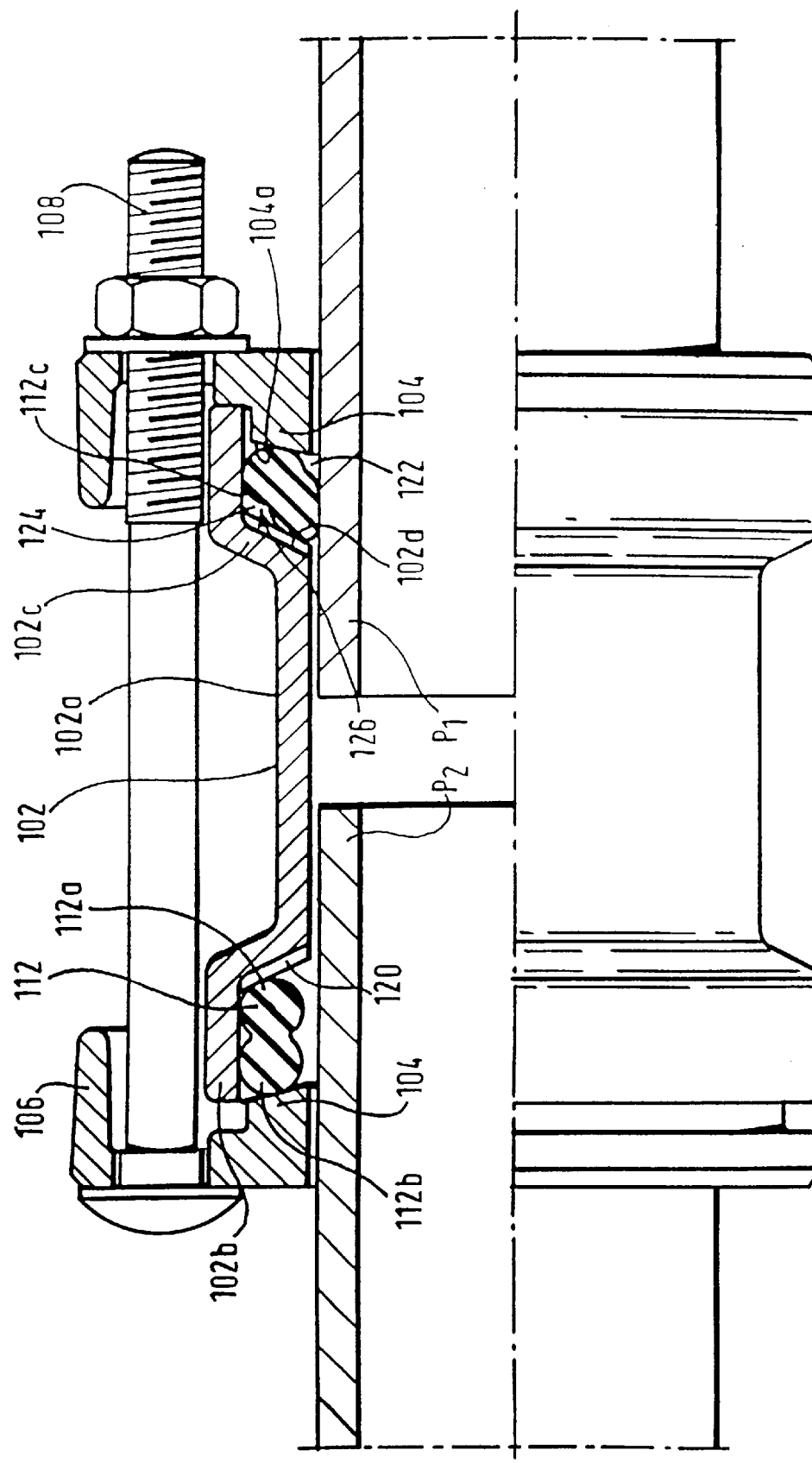
FIG. 1 is a longitudinal partial sectional elevation through a pipe coupling and pipe joint according to one embodiment of the invention.

Referring now to the drawings, FIG. 1 illustrates a pipe coupling comprising a sleeve 102 having a reduced diameter central portion 102a and larger diameter end portions 102b, the central portion and end portions being connected by inclined walls 102c. The sleeve 102 can be formed from a suitably rigid and robust material such as a metal (e.g. iron or steel) in accordance with conventional methods.

A pair of annular compression flanges 106 (compression members) are disposed at the two ends of the sleeve, the compression flanges 106 being connected together by a circumferential array of compression bolts 108. Compression flanges 106 each have a spigot portion 104 at the axially inwardly facing ends thereof, each spigot portion having an inclined face 104a.

Arranged between the spigot portion 104 and the inclined portion 102c of the sleeve separating the smaller diameter and larger diameter regions 102a and 102b is a sealing gasket 112 having a "filled figure of eight" shape in cross section, and having an axially inner lobe 112a and an axially outer lobe 112b. The gasket 112 is made from a suitable elastomeric material.

The radially inner surface 102d of the inclined portion 102c of the sleeve is provided with at least one groove 120 in its surface, the groove 120 in use defining a leak path between the axially inner lobe 112a of the gasket and the surface 102d. There may be present only one groove, or a plurality of grooves spaced around the circumference of the sleeve.

In use, the ends of pipes $P_1$ and $P_2$ are inserted into the sleeve as shown and the flange bolts 108 are tightened to draw the two compression flanges 106 together. As the compression flanges 106 move in an axial direction, the inclined surfaces 104a of the spigot portions 104 are compressed against the sealing gasket 112.

As the sealing gasket is compressed, the axially outer lobe 112b is forced radially outwardly against the sleeve whereas the axially inner lobe 112a is forced radially inwardly against the pipe. Thus the inner lobe 112a forms a seal against the pipe whereas the outer lobe 112b forms a seal against the sleeve. As can be seen from FIG. 1, following compression (see right hand side of the sleeve), an annular gap 122 is created between the axially outer lobe 112b of the gasket and the pipe surface, and an annular gap 124 is formed between the axially inner lobe 112a of the gasket 112 and the inner surface of the sleeve.

As can be seen from FIG. 1, upon assembly and compression of the coupling, a leak path (shown by means of arrows 126) is created between the inner lobe 112a and the sleeve. The leak path enables any fluid (e.g. gas) passing along the annular space between the pipe wall and the sleeve to leak into the annular gap 124 and pressurize the radially outer surface 112c of the sealing gasket. This has the effect of forcing the gasket more tightly against surface 104a of the spigot portion of the compression flange and the inner surface of the sleeve 102 as pressure is increased thereby enhancing the seal between the gasket and the sleeve, and the gasket and the pipe. As a consequence of the enhanced sealing, the torque needed to be applied to the flange bolts 108 in order to achieve a required degree of fluid-tightness for the pipe joint is considerably reduced. This in turn means that the radial inwards force applied through the sealing assembly to the pipe is reduced and therefore it is possible to omit the supporting inserts typically used to prevent pipe ends from collapsing under compression. Furthermore, because lower compressive loads are applied to the gasket and hence to the pipe, the couplings can be used for pipes (e.g. clay pipes) which would fracture under the compressive loads required in conventional couplings.

Figure 2:
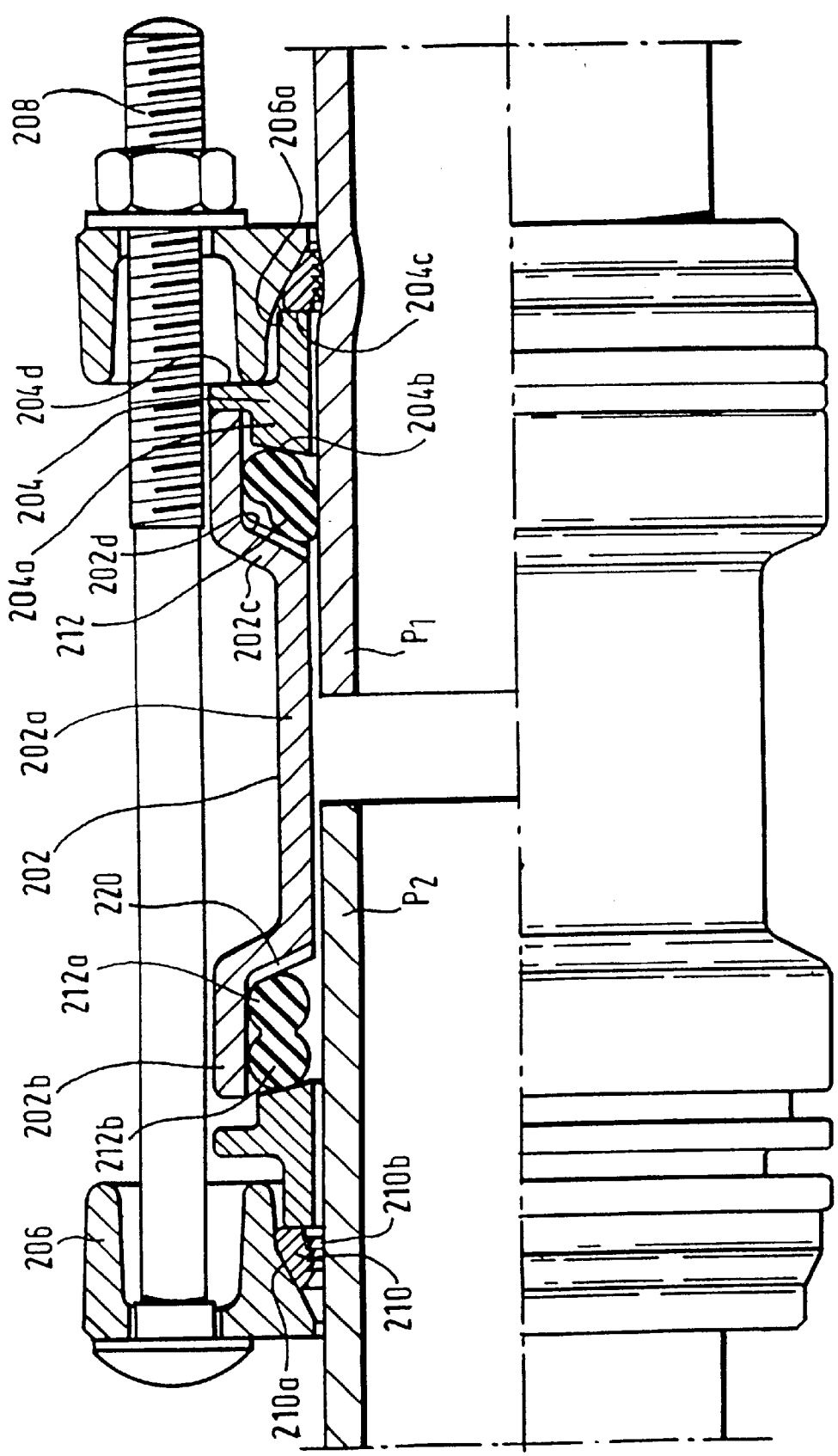
FIG. 2 is a longitudinal sectional elevation of part of a pipe coupling according to a second embodiment of the invention.

In FIG. 1, the coupling has a pair of sealing gaskets but no additional means for gripping the pipe. However, in pipe couplings designed to withstand significant end loads on the pipe, an additional gripping member may be required in order to prevent the pipes from being pulled out of the coupling. FIG. 2 illustrates a coupling generally similar to the coupling of FIG. 1 but having in addition a pair of gripping members.

Thus, FIG. 2 illustrates a pipe coupling comprising a sleeve 202 having a reduced diameter central portion 202a and larger diameter end portions 202b, the central portion and end portions being connected by inclined walls 202c. The sleeve 202 can be formed from a suitably rigid and robust material such as a metal (e.g. iron or steel) in accordance with conventional methods.

A pair of annular compression collars (compression members) 204 are disposed at the two ends of the sleeve 202, the compression collars being held in place by means of compression flanges 206 which are connected together by a circumferential array of compression bolts 208. Compression collars 204 each have a spigot portion 204a at the axially inwardly facing ends thereof, each spigot portion having an inclined face 204b. At its axially outer end, the compression collar 204 has a radially inner abutment surface 204c, and a radially outer abutment surface 204d, both of which in this embodiment are generally perpendicular to the axis of the coupling sleeve although they need not be.

Compression flange 206 has a radially inner surface 206a which is flared in an axially inwards direction. Disposed radially within the compression flange is a gripping ring 210 which, in this embodiment, is formed from a plastics or metal material. Gripping ring 210 has gripping annular serrations or ridges 210a on its inner surface for gripping the surface of a pipe.

Arranged between the compression collar 204 and the inclined portion 202c of the sleeve separating the smaller diameter and larger diameter regions 202a and 202b is a sealing gasket 212 of a similar shape to the sealing gasket shown in FIG. 1, i.e. having a filled figure of eight shape in cross section, and having an axially inner lobe 212a and an axially outer lobe 212b.

As with the embodiment of FIG. 1, the radially inner surface 202d of the inclined portion 202c of the sleeve is provided with at least one groove 220 in its surface, the groove 220 in use defining a leak path between the sealing gasket 212 and the surface 202d.

In use, as the flange bolts 208 are tightened to draw the two compression flanges 206 together, the inclined inner surfaces 206a ride over the inclined outer surfaces 210a of the gripping ring thereby deforming the gripping ring radially inwardly and bringing the serrated gripping surface 210b into gripping contact with the pipes $P_1$ and $P_2$. The compression flanges continue to move in an axial direction, deforming the gripping rings radially inwardly as they do so, until the surfaces 206b of the flanges contact surfaces 204d of the compression collars 204. At this point, further axial movement of the compression flanges forces the compression collars 204 to move axially inwardly against the sealing gasket 212, thereby compressing the gasket.

Thereafter, the gasket is deformed in a similar manner to the gasket of FIG. 1 with the leak path defined by the grooves 220 allowing fluid to pass between the gasket and sleeve so as to pressurize the radially outer surface of the gasket and thereby enhance the seal between the sleeve and the gasket.

In FIGS. 1 and 2, the sealing assembly is shown as comprising a sealing gasket having a cross section shape in the form of a filled figure of eight. However, other configurations are possible for the seal assembly and examples of alternative seals are shown schematically in FIGS. 3 and 4.

In FIG. 3, the sealing assembly comprises a seal 312 having a generally trapezoidal form but which in this embodiment has flattened or rounded radially inner and outer surfaces 312a and 312b respectively. In order to restrain the seal 312 against rotation, the inclined surfaces 204b and 202c of the compression collar 204 and sleeve 202 respectively can be provided with annular grooves (not shown), e.g. V-shaped grooves into which the edges 312c and 312d can fit. In use, as the coupling is compressed by tightening the flange bolts, the seal 312 is compressed axially such that it adopts a shape more akin to an O-ring. Fluid can then pass along a leak path between an axial end portion (e.g. 312c) and the sleeve, the pressure of fluid then serving to pressurize a radially outer surface (e.g. the surface between 312c and 312b) such that the gasket is urged more firmly against the sleeve and pipe thereby to increase the effectiveness of the seal.

A further embodiment of the invention is shown in FIG. 4. In FIG. 4, there is shown a pipe coupling comprising a sleeve 402 having a reduced diameter central portion 402a and larger diameter end portions 402b, the central portion and end portions being connected by inclined walls 402c. The sleeve 402 can be formed from a suitably rigid and robust material such as a metal (e.g. iron or steel) in accordance with conventional methods.

A pair of annular compression collars (compression members) 404 are disposed at the two ends of the sleeve 402, the compression collars being held in place by means of compression flanges 406 which are connected together by a circumferential array of compression bolts 408. Compression collars 404 each have a spigot portion 404a at the axially inwardly facing ends thereof, each spigot portion having an inclined face 404b. At its axially outer end, the compression collar 404 has an abutment surface 404c which in this embodiment is generally perpendicular to the axis of the coupling sleeve although it need not be.

Compression flange 406 has a radially inner surface 406a which is flared in an axially inwards direction. Disposed radially within the compression flange is a gripping ring 410 which, in this embodiment, is formed from a suitable plastic or metal material. Gripping ring 410 has gripping annular serrations or ridges 410b on its inner surface for gripping the surface of a pipe.

Arranged between the compression collar 404 and the inclined portion 402c of the sleeve separating the smaller diameter and larger diameter regions 402a and 402b is a seal assembly 412 comprising a pair of O-rings 414, 416 separated by a spacer ring 418. O-rings 414 and 416 can be of conventional form and are made from a suitable elastomeric material. The spacer ring 418, which can be formed from, for example, a metal or plastics material, is dished and has two substantially parallel inclined surfaces, axially outer surface 418a and axially inner surface 418b.

The radially inner surface 402d of the inclined portion 402c of the sleeve is provided with at least one groove 420 in its surface, the groove 420 in use defining a leak path between the O-ring 416 and the surface 402d.

In use, as with the embodiment of FIG. 2, the ends of pipes $P_1$ and $P_2$ are inserted into the sleeve as shown and the flange bolts 408 are tightened to draw the two compression flanges 406 together. As the compression flanges 406 move in an axial direction, the inclined inner surfaces 406a ride over the inclined outer surfaces 410a of the gripping ring thereby deforming the gripping ring radially inwardly and into gripping contact with the pipes $P_1$ and $P_2$. The compression flanges continue to move in an axial direction, deforming the gripping rings radially inwardly as they do so, until the surfaces 406b of the flanges contact surfaces 404d of the compression collars 404. At this point, further axial movement of the compression flanges forces the compression collars 404 to move axially inwardly against the sealing assembly 412, thereby compressing the O-rings 414, 416.

As the O-rings are compressed, axially outer O-ring 414 is forced outwardly against the sleeve 402 as a result of the angles of inclination of the inclined surfaces 418a and 404a, an annular gap 422 being created between the O-ring 414 and pipe surface. Axially inner O-ring 416, on the other hand, is forced radially inwardly against the pipes as a consequence of compression between the inclined surfaces 418b and 402d, such that an annular gap 424 is formed between the O-ring 416 and the inner surface of the sleeve.

As can be seen from FIG. 4, upon assembly and compression of the coupling, a leak path (shown by means of arrows 426) is created between the O-ring 416 and the sleeve. The leak path enables any fluid (e.g. gas) passing along the annular space between the pipe wall and the sleeve to leak into the annular gap 424 and pressurize the outer surface 414a of O-ring 414. This has the effect of forcing the O-ring more tightly against surface 404b of the compression collar and the inner surface of the sleeve 2 thereby enhancing the seal between the O-ring and the sleeve.

In each of the illustrated embodiments, the gasket is configured such that upon compression, an annular gap is formed between the axially inner lobe or part of the sealing member and the sleeve, the annular gap being in fluid communication with the leak path. However, it is conceivable that the gasket could be shaped such that although no annular gap is formed, a region of the gasket at the axially inner end is under relatively light compression. Such a lightly compressed region could be displaced by fluid pressure from within the pipe thus in effect creating an annular gap of the type shown in the drawings.

It will readily be apparent that numerous modifications and alterations could be made to the pipe couplings shown in the drawings and described above without departing from the principles underlying the invention and all such modifications and alterations are intended to be within the scope of this application.

What is claimed is:

1. A pipe coupling for attachment to a pipe, the coupling comprising a sleeve, the sleeve having at least one end which is configured to receive therein an end of the pipe, the at least one end having an enlarged bore region; annular sealing means completely disposed within the enlarged bore region for encircling the pipe end; and compression means for compressing the annular sealing means to form a seal between the pipe and the sleeve; wherein at least one of the sleeve and the sealing means is configured so as to define a leak path between an axially inner portion of the sealing means and the inner surface of the sleeve whereby in use pressurized fluid from the pipe may pass along the leak path so as to pressurize a radially outer surface of the sealing means and urge the sealing means against the compression means thereby to enhance the seal between the sealing means and the sleeve.

2. A pipe coupling according to claim 1 wherein the sealing means, sleeve and compression means are configured such that in use, upon application of a compression force through the compression means, an axially outer portion of the sealing means is forced radially outwardly and into sealing engagement with the sleeve, whilst an axially inner portion of the sealing means is urged radially inwardly and into sealing engagement with the pipe.

3. A pipe coupling according to claim 2 wherein an annular void is formed between a radially outer surface of the axially inner portion of the sealing means and the sleeve, the annular void being in fluid communication with the leak path.

4. A pipe coupling according to claim 1 wherein the sealing means comprises a gasket and a region of the gasket at the axially inner end thereof is subject to relatively light compression upon assembly such that in use, fluid pressure within the pipe can displace the lightly compressed gasket to form an annular void, which void is in fluid communication with the leak path.

5. A pipe coupling according to claim 1 wherein the leak path is defined by one or more channels created between the sealing means and sleeve as the sealing means is compressed.

6. A pipe coupling according to claim 5 wherein the channels are defined by one or more grooves in the surface of the sleeve.

7. A pipe coupling according to claim 5 wherein a plurality of grooves are provided, the grooves being generally axially aligned and being spaced around the circumference of the sleeve.

8. A pipe coupling according to claim 6 wherein the or each groove follows a helical path around the inner surface of the sleeve.

9. A pipe coupling according to claim 5 wherein the channels are defined by protrusions from the surface of the sleeve, the protrusions serving to at least partially space the surface away from the sealing means.

10. A pipe coupling according to claim 1 wherein the compression means comprises an annular compression member which is arranged to encircle the pipe.

11. A pipe coupling according to claim 1 wherein the enlarged bore region is linked to a relatively reduced bore region by an annular abutment surface.

12. A pipe coupling according to claim 11 wherein the annular abutment surface is inclined radially outwardly in the direction of the end of the sleeve.

13. A pipe coupling according to claim 10 wherein the annular compression member has a compression surface for compressing the sealing means, which compression surface is inclined radially inwardly in a direction towards the sleeve.

14. A pipe coupling according to claim 1 wherein the sealing means comprises a sealing member having a multi-lobed shape in cross section.

15. A pipe coupling according to claim 14 wherein the sealing member has a filled figure of eight cross section.

16. A pipe coupling according to claim 1 wherein the sealing means comprises a pair of O-rings.

17. A pipe coupling according to claim 16 wherein the two O-rings are separated by a spacer ring.

18. A pipe coupling according to claim 17 wherein the spacer ring has an inclined axially inner surface whereby compression of the axially inner O-ring by the spacer ring upon application of the compression means urges the said axially inner O-ring against the pipe.

19. A pipe coupling according to claim 17 wherein the spacer ring has an inclined axially outer surface which assists in deforming the axially outer O-ring outwardly against the sleeve when the said axially outer O-ring is compressed by the compression means.

20. A pipe coupling according to claim 1 wherein the sealing means has a substantially trapezoidal cross section.

21. A pipe coupling according to claim 10 comprising an annular compression flange disposed axially outwardly of the annular compression member and a plurality of flange bolts to enable the annular compression flange to be tightened against the annular compression member thereby to compress the sealing means.

22. A pipe coupling according to claim 1 wherein both ends of the sleeve are arranged to receive therein the respective ends of a pair of pipes.

23. A pipe coupling according to claims 22 wherein the sleeve, annular sealing means and compression means have substantially the same configuration at both ends of the sleeve.

24. A pipe joint comprising a pipe coupling as defined in claim 1 having a pipe disposed in the end of the sleeve thereof.

25. A pipe joint according to claim 24 wherein the pipe is formed from a plastics material.

26. A pipe joint according to claim 25 wherein the plastics material is selected from polyolefins and polyvinylchloride.

27. A pipe joint according to claim 25 wherein the end of the pipe is unsupported.

28. A pipe joint according to claim 24 wherein the pipe is formed from a brittle material.

29. A pipe coupling for attachment to a pipe, the coupling comprising a sleeve, the sleeve having at least one end which is configured to receive therein an end of the pipe, the at least one end having an enlarged bore region; annular sealing means completely disposed within the enlarged bore region for encircling the pipe end; and compression means for compressing the annular sealing means to form a seal between the pipe and the sleeve; wherein there is formed a leak-path between an axially inner portion of the sealing means and an inner surface of the sleeve whereby in use pressurized fluid from the pipe may pass along the leak-path so as to pressurize a radially outer surface of the sealing means and urge the sealing means against the compression means thereby to enhance the seal between the sealing means and the sleeve.

30. A pipe coupling according to claim 29 wherein the sealing means, sleeve, and compression means are configured such that in use, upon application of a compression force through the compression means, an axially outer portion of the sealing means is forced radially outwardly and into sealing engagement with the sleeve, whilst the axially inner portion of the sealing means is urged radially inwardly and into sealing engagement with the pipe.

31. A pipe coupling according to claim 30 wherein an annular void is formed between a radially outer surface of the axially inner portion of the sealing means and the sleeve, the annular void being in fluid communication with the leak path.

32. A pipe coupling according to claim 29 wherein the leak-path is defined by at least one channel formed between the sealing means and the sleeve.

33. A pipe coupling according to claim 29 wherein the compression means comprises an annular compression member which is arranged to encircle the pipe.

34. A pipe coupling according to claim 33 comprising an annular compression flange disposed axially outwardly of the annular compression member and a plurality of flange bolts to enable the annular compression flange to be tightened against the annular compression member thereby to compress the sealing means.

35. A pipe coupling according to claim 34 comprising a gripping ring disposed axially between the compression flange and the compression member arranged to be deformed radially inwardly against the pipe by compression between the compression flange and compression member.

36. A pipe coupling according to claim 29 wherein the enlarged bore region is linked to a relatively reduced bore region by an annular abutment surface.

37. A pipe coupling according to claim 36 wherein the annular abutment surface is inclined radially outwardly in the direction of the end of the sleeve.

38. A pipe coupling according to claim 29 wherein the sealing means comprises a sealing member having a multi-lobed shape in cross section.

39. A pipe coupling according to claim 38 wherein the sealing member has a filled figure of eight cross section.

40. A pipe coupling according to claim 29 wherein the sealing means comprises a pair of O-rings.

41. A pipe coupling according to claim 40 wherein the two O-rings are separated by a spacer ring.

42. A pipe coupling according to claim 41 wherein the spacer ring has an inclined axially inner surface whereby compression of an axially inner O-ring by the spacer ring upon application of the compression means urges the axially inner O-ring against the pipe.

43. A pipe coupling according to claim 41 wherein the spacer ring has an inclined axially outer surface which assists in deforming an axially outer O-ring outwardly against the sleeve when the axially outer O-ring is compressed by the compression means.

44. A pipe coupling according to claim 29 wherein the sealing means has a substantially trapezoidal cross section.

45. A pipe coupling according to claim 44 wherein the sealing means comprises a pair of axially aligned edges and a pair of radially aligned edges, distance between the axially aligned edges being greater than distance between the radially aligned edges.

46. A pipe coupling according to claim 45 wherein the radially aligned edges are flattened to assist holding the sealing means against rotation.

47. A pipe coupling according to claim 44 wherein at least one of the sleeve and the compression means is provided with a locating means for locating and holding at least one edge of the trapezoidal sealing member so as to prevent rotation.

48. A pipe coupling according to claim 47 wherein the locating means comprises at least one of a groove and a recess into which an edge of the sealing means can fit.

49. A pipe coupling according to claim 29 wherein the sleeve has two ends and the ends of the sleeve are arranged to receive therein respective ends of a pair of pipes.

50. A pipe coupling according to claim 49 wherein the sleeve, annular sealing means, and compression means have substantially the same configuration at both ends of the sleeve.

51. A pipe joint comprising a pipe coupling as defined in claim 29 having a pipe disposed in the end of the sleeve thereof.

52. A pipe joint according to claim 51 wherein the pipe is formed from a plastics material.

53. A pipe joint according to claim 52 wherein the plastics material is selected from polyolefins and polyvinylchloride.

54. A pipe joint according to claim 52 wherein the end of the pipe is unsupported.

55. A pipe joint according to claim 51 wherein the pipe is formed from a brittle material.

* * * * *